(12) United States Patent
Lin

(10) Patent No.: US 7,890,866 B2
(45) Date of Patent: Feb. 15, 2011

(54) ASSISTANT EDITING DISPLAY METHOD FOR MEDIA CLIPS

(75) Inventor: Brian Lin, Taipei (TW)

(73) Assignee: Cyberlink Corp. (TW)

( * ) Notice: Subject to any disclaimer, the term of this patent is extended or adjusted under 35 U.S.C. 154(b) by 772 days.

(21) Appl. No.: 11/896,003

(22) Filed: Aug. 29, 2007

(65) Prior Publication Data

US 2007/0297751 A1   Dec. 27, 2007

Related U.S. Application Data

(63) Continuation of application No. 10/438,974, filed on May 16, 2003, now abandoned.

(51) Int. Cl.
*G06F 3/00* (2006.01)
(52) U.S. Cl. .................... 715/720; 715/723
(58) Field of Classification Search .......... 715/720, 715/723
See application file for complete search history.

(56) References Cited

U.S. PATENT DOCUMENTS

| | | | |
|---|---|---|---|
| 5,519,828 A * | 5/1996 | Rayner | 715/723 |
| 6,262,724 B1 * | 7/2001 | Crow et al. | 715/723 |
| 6,404,978 B1 * | 6/2002 | Abe | 386/55 |
| 6,414,686 B1 * | 7/2002 | Protheroe et al. | 345/474 |
| 6,714,216 B2 * | 3/2004 | Abe | 715/723 |
| 6,730,031 B2 * | 5/2004 | Liu et al. | 600/443 |
| 6,778,223 B2 * | 8/2004 | Abe | 348/559 |
| 6,850,256 B2 * | 2/2005 | Crow et al. | 715/798 |
| 2003/0122966 A1 * | 7/2003 | Markman et al. | 348/563 |
| 2004/0230910 A1 * | 11/2004 | Lin | 715/723 |
| 2007/0297751 A1 * | 12/2007 | Lin | 386/4 |
| 2010/0235746 A1 * | 9/2010 | Anzures | 715/723 |

* cited by examiner

*Primary Examiner*—William L Bashore
*Assistant Examiner*—David Phantana-angkool
(74) *Attorney, Agent, or Firm*—Harness, Dickey & Pierce, P.L.C.

(57) ABSTRACT

A clip editing method using double time axis and an assistant display mode includes: generating a first trim-bar interface with a first time axis, specifying a first media clip through the first trim-bar interface by using a three-point control method, generating a second trim-bar interface with a second time axis based on the duration of the first media clip by using an equal-proportion mechanism, the duration of the second time axis being the same as the duration of the first media clip, the display ratio of the first media clip being resized, generating a second media clip through the second trim-bar interface by using the three-point control method, and providing editing operations for the second media clip.

16 Claims, 5 Drawing Sheets

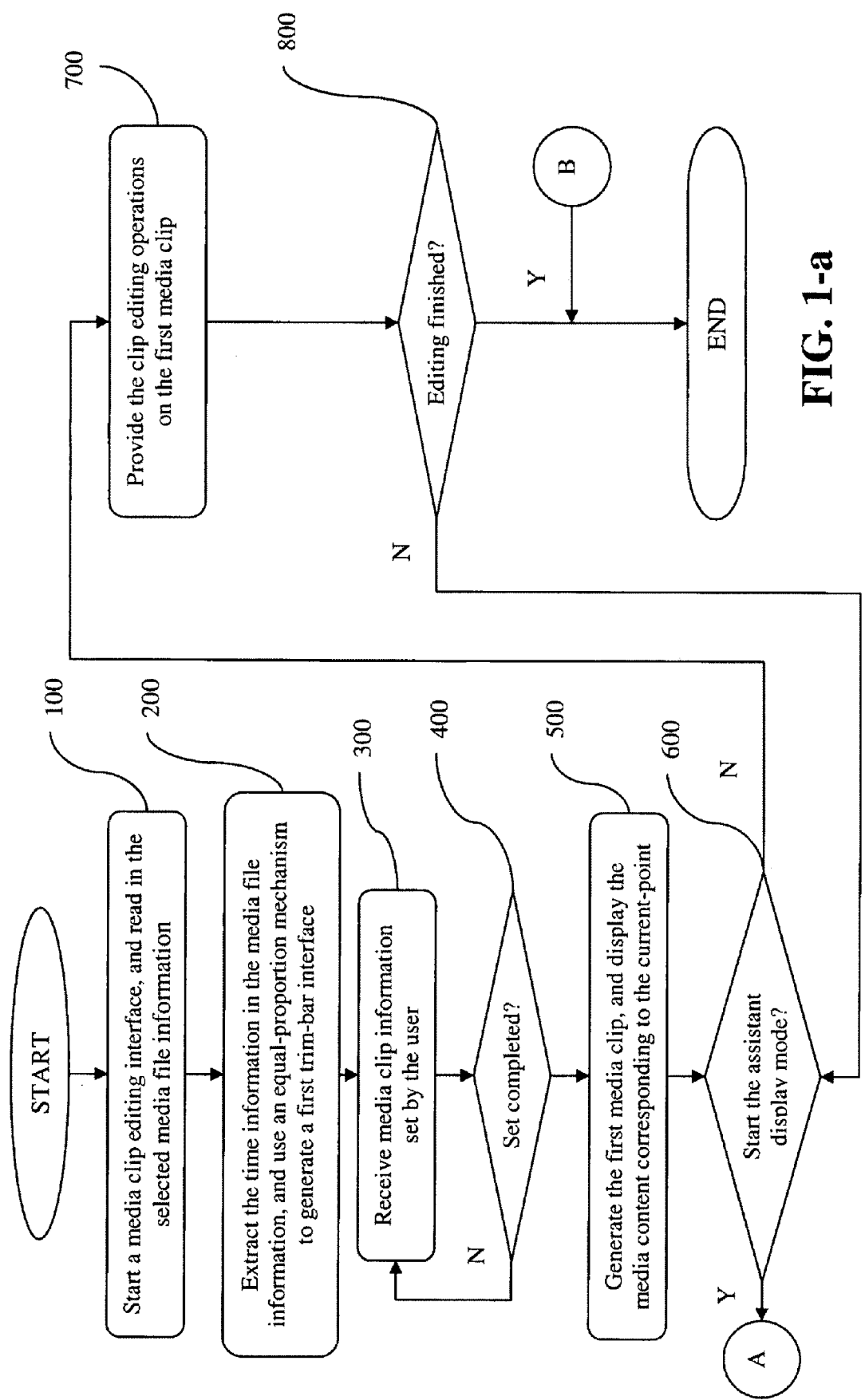
FIG. 1-a

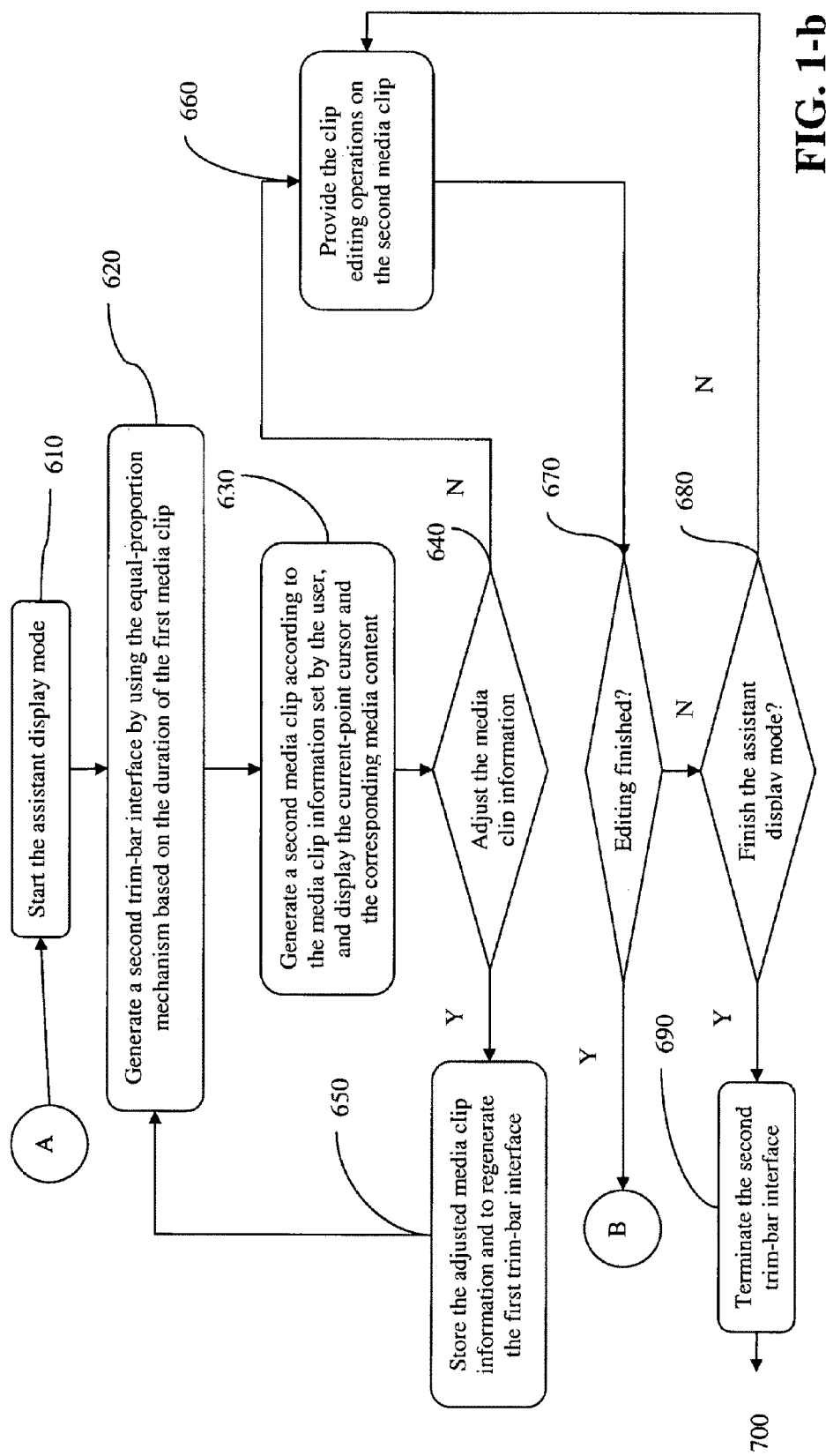
FIG. 1-b

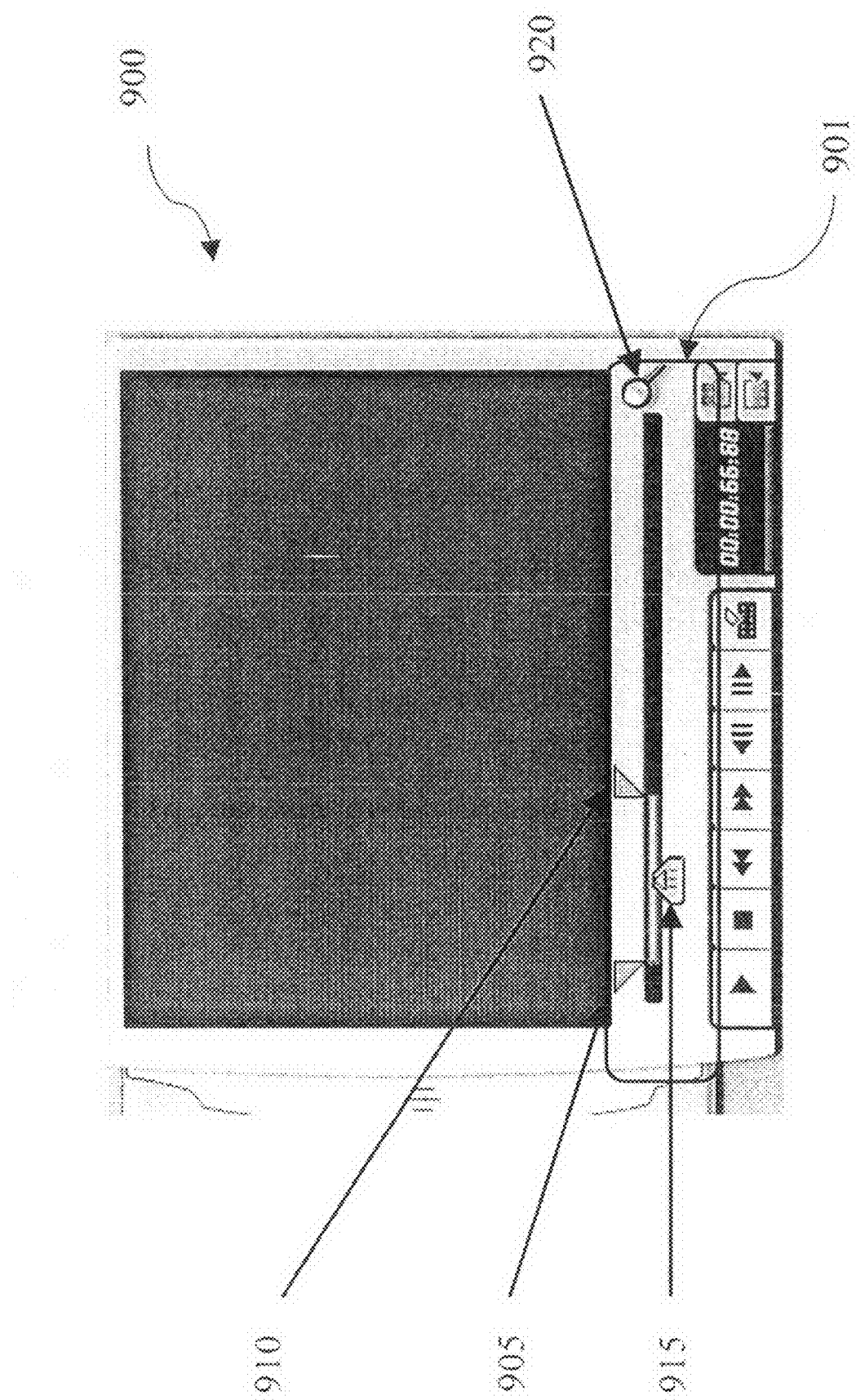
FIG.2-a

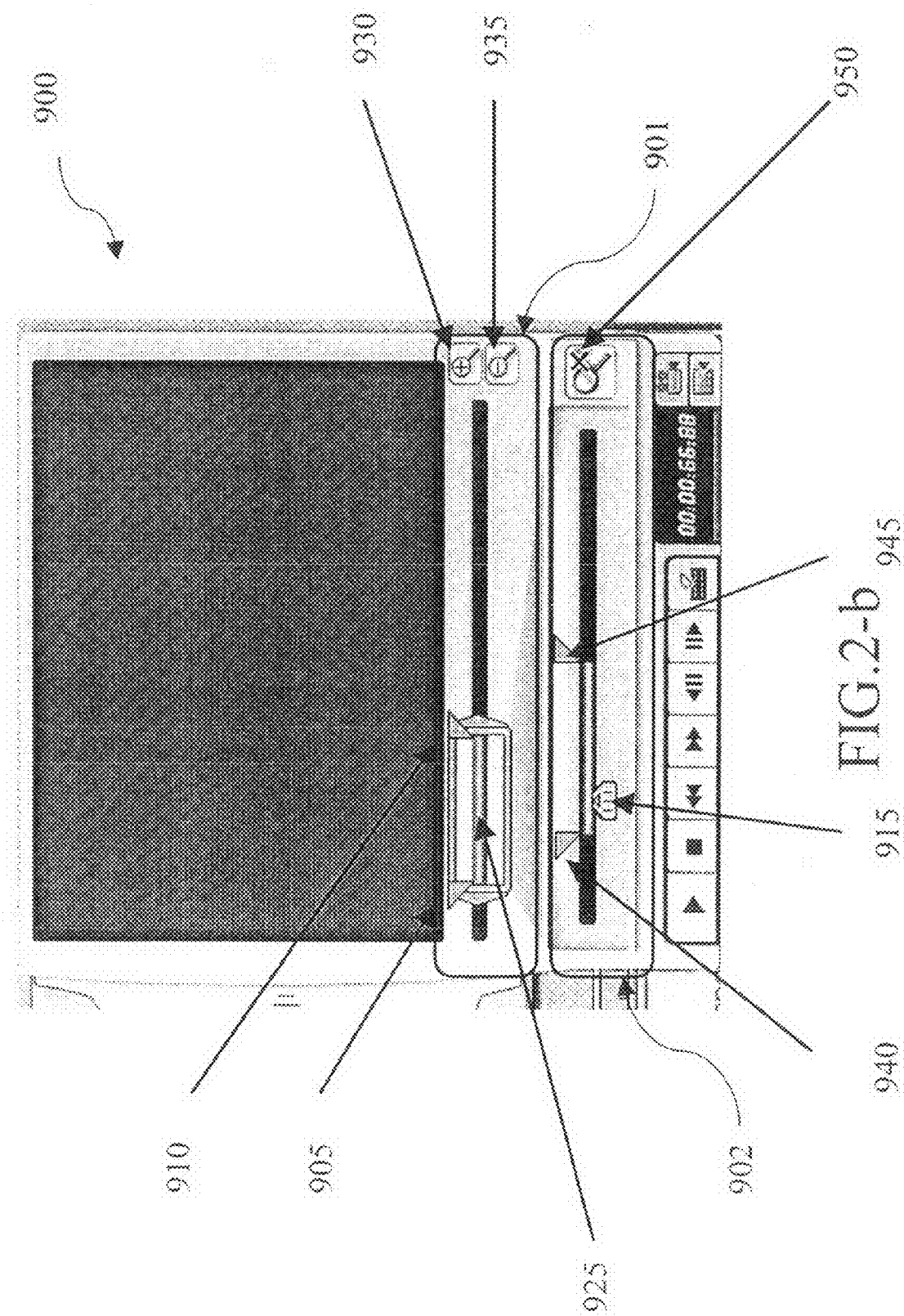

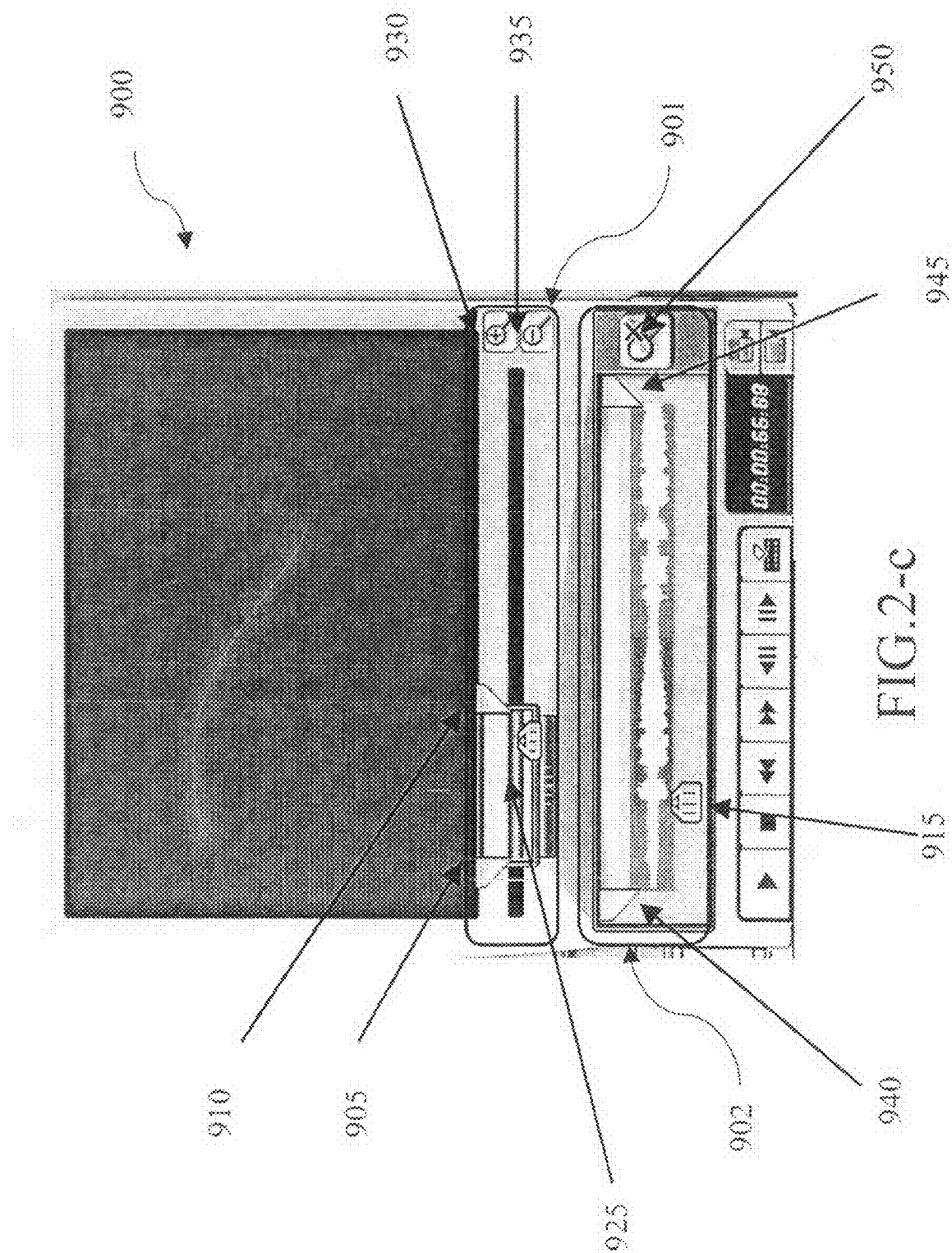
FIG.2-c

ASSISTANT EDITING DISPLAY METHOD FOR MEDIA CLIPS

CROSS-REFERENCE TO RELATED APPLICATIONS

This is a continuation application of U.S. application Ser. No. 10/438,974 filed on May 16, 2003, now abandoned the entire contents of which are hereby incorporated by reference.

BACKGROUND OF THE INVENTION

1. Field of Invention

The invention relates to a multimedia editing method, and more particularly to a clip editing method using double time axes and an assistant display mode.

2. Related Art

Currently, multimedia editing methods include linear editing and nonlinear editing. The conventional linear editing method relies heavily on the uses of various hardware devices. The linear editing process is a tape-to-tape copying process. Therefore, the linear editing method is expensive, inflexible, and inefficient. Moreover, if the screen effects to be processed are too complicated, it is almost impossible to edit them without using fancy hardware devices. Otherwise, a great deal of effort and time have to be spent on repeatedly processing the same frame. All such inconveniences render the linear editing and processing method less favorable. This method is only adopted by very few television media companies.

The nonlinear editing method is a newly-emerged technology. Since the nonlinear method uses a digitized way to edit multimedia clips, it is thus more convenient, flexible and efficient, but less expensive in processing than the linear method. It is currently the most popular multimedia editing and processing method. Such nonlinear multimedia editing method use a single time axis to represent the time relation of the information in a media file. The three-point control method may be used to define a media clip to be edited by setting an in-point, an out-point, and a current-point set by a user. Then, various media editing processes for the media clip may be performed.

However, the conventional three-point control method is likely to cause problems when a source media file is too long. Take a two-hour long media file as an example, a clip in the media file the clips visible to the user on the horizontal time axis are in units of 5 minutes, 10 minutes, or 20 minutes (depending upon the multimedia editing and processing software). Using the three-point control method, the user can only perform large-area media clip editing. There is no way to quickly and precisely find the desired media contents in a media clip for detailed processing. Sometimes it is even impossible to perform editing. Therefore, one cannot make high-quality media using the conventional software.

Therefore, it is necessary to develop a media editing and processing method based upon current computer software technology to provide a new user interface for media clip presentation. Not only should the user experience more precise media clip visualization, the software should also enables the user to perform precise and detailed editing on an assigned media clip in a more efficient and convenient way.

SUMMARY OF THE INVENTION

Example embodiments of the present invention provide an improved three-point control method to perform media clip editing. In example embodiments of the present invention, a double time axes may be used to generate an assistant editing display of a media clip. In example embodiments of the present invention, the duration of a second time axis may be the same as a specified first media clip in the first time axis. Thus, a user may resize the display ratio of the specified first media clip to thereby perform more detailed editing and processing on the first media clip.

In example embodiment of the present invention, a user may arbitrarily adjust the range of a media clip or resize the media clip as needed at any time. A clip editing method according to example embodiments of the present invention may be easier, more precise and more efficient.

In an example embodiment of the present invention, a clip editing method using three-point control method and an assistant display mode includes: generating a first trim-bar interface with a first time axis, specifying a first media clip through the first trim-bar interface by using a three-point control method, generating a second trim-bar interface with a second time axis based on the duration of the first media clip by using an equal-proportion mechanism, the duration of the second time axis being the same as the duration of the first media clip, the display ratio of the first media clip thus being resized, generating a second media clip through the second trim-bar interface by using the three-point control method, and providing editing operations for the second media clip.

BRIEF DESCRIPTION OF THE DRAWINGS

The invention will become more fully understood from the detailed description given herein below illustration only, and thus are not limitative of the present invention, and wherein:

FIG. 1-*a* is a flowchart of the media clip editing method according to an example embodiment of the present invention;

FIG. 1-*b* is a flowchart of the media clip editing method according to an example embodiment of the present invention;

FIG. 2-*a* illustrates an example embodiment of the present invention;

FIG. 2-*b* illustrate an example embodiment of the present invention; and

FIG. 2-*c* illustrates an example embodiment of the present invention.

DETAILED DESCRIPTION OF THE INVENTION

The present invention will now be described more fully with reference to the accompanying drawings, in which example embodiments of the present invention are shown. However, the present invention should not be construed as being limited to the example embodiments set forth herein; rather, these example embodiments are provided as working examples.

Example embodiments of the present invention may be used for media clips with the time concept. The media clip may contain at least video information and sound information. In comparison with the conventional three-point control method used in the conventional multimedia editing and processing software that performs media clip editing along a single horizontal time axis, example embodiments of the present invention provide an improved three-point control method using double-time axes. Through the visualization of the search rods and the media clip user interfaces, the user can accurately find the media clip frame to be edited and perform detailed editing and processing.

FIGS. 1-*a* and 1-*b* are flow charts describing a media clip editing processes according to example embodiments of the present invention. FIGS. 2-*a*, 2-*b*, and 2-*c* illustrate an example embodiment of the present invention. Referring to FIG. 1-*a*, when a user starts a media clip editing process, a media clip editing interface 900 will be displayed first, reading in a source media file information (step 100). The source media file information may contain: name, time, file size, and media source path. FIG. 2-*a* shows the media clip editing interface 900. Then, the time information in the source media file information is extracted to generate a first trim-bar interface 901 by using an equal-proportion mechanism (step 200). The equal-proportion mechanism sets the rod adjustment sections of the first trim-bar interface according to the time information (e.g. dividing a one-hour media file into ten sections, or dividing a ten-minute media file into five sections, etc). The number of sections can be set by the user through the media clip editing interface 900. In step 300, the user sets media clip information, which contains: in-point time, out-point time, and a current-point cursor position. FIG. 2-*a* shows the first in-point time indicator 905, the first out-point time indicator 910, and the current-point cursor 915. The interval between the first in-point time indicator 905 and the first out-point time indicator 910 specifies a first media clip. The position of the current-point cursor 915 indicates the time point corresponding to the current media clip screen. Then, whether the media clip information setting is completed is determined in step 400. If not, the procedure goes back to step 300. Otherwise, the media content corresponding to the current-point cursor 915 is displayed (step 500). In step 600, the user may decide whether to start an assistant display mode based on the specific situations, as an example, the duration of the source media file may be so long that a media clip extracted from the source media file is hard to edit. The user may press the assistant display mode button 920 shown in FIG. 2-*a* to start the mode. If the mode is started, then the procedure continues to step A in FIG. 1-*b*. Otherwise, the media clip editing operations for the first media clip are performed (step 700). In step 800, whether the editing is complete is determined. If so, the whole media clip editing display procedure is complete. Otherwise, the procedure returns to step 600 and repeats steps following that.

Referring to FIG. 1-*b*, an assistant display mode is started in step 610. A second trim-bar interface 902 with a second time axis as shown in FIG. 2-*b* and FIG. 2-*c* is generated by using the equal-proportion mechanism based on the duration of the first media clip as in step 620. That is, a second time axis may be generated by using the equal-proportion mechanism. The duration of the second time axis may be the same as the duration of first media clip defined by in-point time indicator 905, the first out-point time indicator 910 as shown in FIG. 2-*a*. In other words, the display ratio of the first media clip is resized. Then, a second media clip is generated according to the media clip information set by a user. As shown in FIG. 2-*b* and FIG. 2-*c*, the interval between the second in-point time 940 and the second out-point time 945 forms a second media clip and the position of the current-point cursor 915 indicates the time corresponding to the current contents in media clip screen. Meanwhile, the first media clip becomes the assistant display media clip 925 as shown in FIG. 2-*b* (or FIG. 2-*c*). The equal-proportion mechanism sets the rod adjustment sections of the second trim-bar interface according to the media clip time information set by the user (the media clip time information is the difference between the out-point time and the in-point time). The number of sections can be set by the user through the media clip editing interface 900. For example, the user can use the zoom-in button 930 or zoom-out button 935 in FIG. 2-*b* to perform settings. In step 630 the media content corresponding to the current-point cursor is displayed. Then, the user will decide whether to adjust the media clip information. The user may use the mouse to immediately adjust the in-point time or out-point time of the first media clip information (i.e. the assistant display media clip 925) in a dragging way. If any adjustment is needed, then the procedure goes to step 650 to store the adjusted media clip information and to regenerate the first media clip interface 901, followed by step 620 again. Then, the adjusted media clip information is used to generate a corresponding second trim-bar interface 902 by using the equal-proportion mechanism. If no adjustment is needed, step 660 provides various media editing operations on the second media clip. Step 670 determines whether the editing is complete. If so, the procedure continues to step B in FIG. 1-*a*, finishing the whole media clip editing display procedure. Otherwise, step 680 determines whether the user chooses to finish the assistant display mode. The user can use the ending button 950 in FIG. 2-*b* (or FIG. 2-*c*) to finish the assistant display mode. In this case, step 690 terminates the second trim-bar interface 902, followed by step 700 (i.e. going back to the editing state with only the first trim-bar interface) for the user to perform various media editing operations on the first media clip. If the user has not finished the assistant display mode, the procedure returns to step 660.

While example embodiments of the present invention has been described, it will be understood by those of ordinary skill in the art that various changes in form and details may be made therein without departing from the scope of the example embodiments of the present invention.

What is claimed is:

1. A clip editing method using double time axis and an assistant display mode, comprising:
    generating a first trim-bar interface with a first time axis;
    specifying a first media clip extracted from a source media file through the first trim-bar interface by using an three-point control method;
    generating a second trim-bar interface with a second time axis based on the duration of the first media clip by using an equal-proportion mechanism, the duration of the second time axis being the same as the duration of the first media clip, and thus the display ratio of the first media clip being resized;
    generating a second media clip through the second trim-bar interface by using the three-point control method;
    providing media editing operations for the second media clip; and
    concurrently displaying the first trim-bar interface and the second trim-bar interface in a display screen.

2. The method of claim 1 is applied to media clip editing display process with the time concept.

3. The method of claim 1, wherein the media clip include at least video information and sound information.

4. The method of claim 1, further comprising:
    starting a media clip editing interface and reading in information in the source media file; and
    extracting the time information from the information in the source media file to thereby generate the first trim-bar interface by using the equal-proportion mechanism.

5. The method of claim 4, wherein the equal-proportion mechanism is used to set number of rod adjustment sections in the first trim-bar interface according to the time information in the information of the source media file.

6. The method of claim 4, wherein the equal-proportion mechanism is performed at real time through an interface.

7. The method of claim 1, wherein the first media clip is specified according to a first media clip information set by a user.

8. The method of claim 7, wherein the first media clip information at least includes an in-point time, an out-point time and a current-point cursor.

9. The method of claim 7, wherein the first media clip information is the difference between an out-point time and an in-point time.

10. The method of claim 1, wherein the second media clip is generated according to a second media clip information set by a user.

11. The method of claim 10, wherein the second media clip information at least includes an in-point time, an out-point time and a current-point cursor.

12. The method of claim 10, wherein the first media clip information is the difference between an out-point time and an in-point time.

13. The method of claim 1, wherein the equal-proportion mechanism is used to set number of rod adjustment sections in the second trim-bar based on the duration of the first media clip.

14. The method of claim 1, wherein the equal-proportion mechanism is performed at real time through an interface.

15. The method of claim 1, wherein the first media clip is immediately adjustable by dragging in the first trim-bar interface.

16. The method of claim 1, wherein the second clip is immediately adjustable by dragging in the second trim-bar interface.

* * * * *